US009338131B2

(12) United States Patent
Hirouchi (10) Patent No.: US 9,338,131 B2
(45) Date of Patent: May 10, 2016

(54) INFORMATION PROCESSING APPARATUS, CONTROL METHOD FOR INFORMATION PROCESSING APPARATUS, AND STORAGE MEDIUM

(71) Applicant: CANON KABUSHIKI KAISHA, Tokyo (JP)

(72) Inventor: Yasuo Hirouchi, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 188 days.

(21) Appl. No.: 14/085,507

(22) Filed: Nov. 20, 2013

(65) Prior Publication Data

US 2014/0149567 A1    May 29, 2014

(30) Foreign Application Priority Data

Nov. 26, 2012    (JP) ................................ 2012-257558

(51) Int. Cl.
*G06F 15/173* (2006.01)
*H04L 29/12* (2006.01)
*H04L 12/24* (2006.01)

(52) U.S. Cl.
CPC ........ *H04L 61/6004* (2013.01); *H04L 41/0816* (2013.01); *H04L 41/0869* (2013.01); *H04L 61/6022* (2013.01); *H04L 41/0886* (2013.01)

(58) Field of Classification Search
CPC ............ H04L 61/6004; H04L 61/6022; H04L 41/0816; H04L 41/0869
USPC ......................................... 709/224
See application file for complete search history.

(56) References Cited

U.S. PATENT DOCUMENTS

| 5,742,603 | A  | * | 4/1998 | Shafir et al. | 370/401 |
|---|---|---|---|---|---|
| 7,631,064 | B1 | * | 12/2009 | Gray | 709/224 |
| 8,966,608 | B2 | * | 2/2015 | Jarredal | 726/13 |
| 2003/0106067 | A1 | * | 6/2003 | Hoskins et al. | 725/119 |
| 2006/0114863 | A1 | * | 6/2006 | Sanzgiri et al. | 370/338 |
| 2007/0097904 | A1 | * | 5/2007 | Mukherjee et al. | 370/328 |
| 2009/0262382 | A1 | * | 10/2009 | Nobutani | 358/1.15 |
| 2010/0077026 | A1 | * | 3/2010 | Watanabe et al. | 709/203 |
| 2010/0202424 | A1 | * | 8/2010 | Chin et al. | 370/338 |
| 2010/0312895 | A1 | * | 12/2010 | Fujii | 709/226 |
| 2012/0054359 | A1 | * | 3/2012 | Yamada | 709/229 |
| 2013/0141749 | A1 | * | 6/2013 | Chiba | 358/1.14 |
| 2013/0185552 | A1 | * | 7/2013 | Steer | 713/156 |
| 2014/0286321 | A1 | * | 9/2014 | Balian et al. | 370/338 |
| 2014/0317623 | A1 | * | 10/2014 | Yokoyama | 718/1 |

FOREIGN PATENT DOCUMENTS

JP    2000-151670 A    5/2000

* cited by examiner

*Primary Examiner* — Karen Tang
(74) *Attorney, Agent, or Firm* — Canon USA Inc. IP Division (57) ABSTRACT

An information processing apparatus including a network controller which controls communication with an apparatus on a network includes a storage unit configured to store reference information to determine whether the network controller is a usable network controller, a determination unit configured to determine whether the network controller is a usable network controller based on the reference information and identification information for identifying the network controller, an acquisition unit configured to acquire update information for updating the reference information from an external apparatus in a case where the determination unit determines that the network controller is not a usable network controller, and an update unit configured to update the reference information stored in the storage unit based on the update information acquired by the acquisition unit.

8 Claims, 8 Drawing Sheets

| | VENDOR ID | |
|---|---|---|
| 1 | 00-00-85 | ~301 |
| 2 | 00-1E-8F | ~302 |
| 3 | 18-0C-AC | ~303 |

VENDOR ID TABLE 300

FIG. 3B

| | VENDOR ID | |
|---|---|---|
| 1 | 00-00-85 | ~301 |
| 2 | 00-1E-8F | ~302 |
| 3 | 18-0C-AC | ~303 |
| 4 | 88-87-17 | ~311 |

VENDOR ID TABLE 310

STRUCTURE OF MAC ADDRESS

| 1 | 2 | 3 | 4 | 5 | 6 |
|---|---|---|---|---|---|
| 00 | 00 | 85 | 01 | 02 | 03 |

VENDOR ID PROVIDED BY IEEE — ADDRESS MANAGED BY VENDOR

FIG. 7

STRUCTURE OF ETHERNET FRAME

| 8 OCTETS | 6 OCTETS | 6 OCTETS | 2 OCTETS | 46~1500 OCTETS | 4 OCTETS |
|---|---|---|---|---|---|
| PREAMBLE | DESTINATION ADDRESS | SOURCE ADDRESS | TYPE | DATA | FCS |

INFORMATION PROCESSING APPARATUS, CONTROL METHOD FOR INFORMATION PROCESSING APPARATUS, AND STORAGE MEDIUM

BACKGROUND

1. Technical Field

The present disclosure relates to an information processing apparatus, a control method for the information processing apparatus, and a storage medium.

2. Description of the Related Art

Information processing apparatuses such as a personal computer (PC), a printer, and a multifunction peripheral include a network controller, and the network controller controls communication with external apparatuses on a network. At this time, as information for identifying a transmission source, an information processing apparatus transmits a media access control (MAC) address of its own network controller by attaching the MAC address to an Ethernet frame of a network packet.

Figure 6:
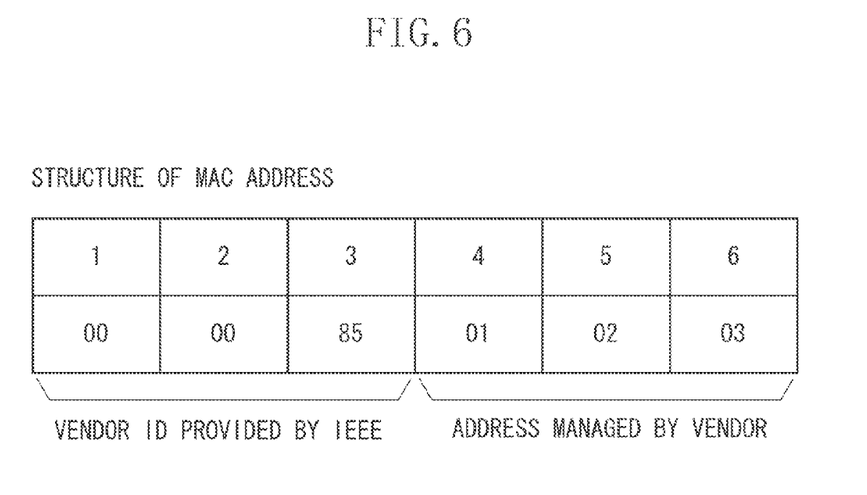
FIG. 6 is a diagram illustrating a structure of a MAC address.

FIG. 6 is a diagram illustrating a structure of the MAC address. The first 3 octets of the MAC address is managed by the Institute of Electrical and Electronics Engineers, Inc. (hereinafter, referred to as "IEEE"), and corresponds to a vendor identification (ID) provided to each vendor. The last 3 octets of the MAC address is managed by each vendor so that the same MAC address does not exist in the vendor.

Figure 7:
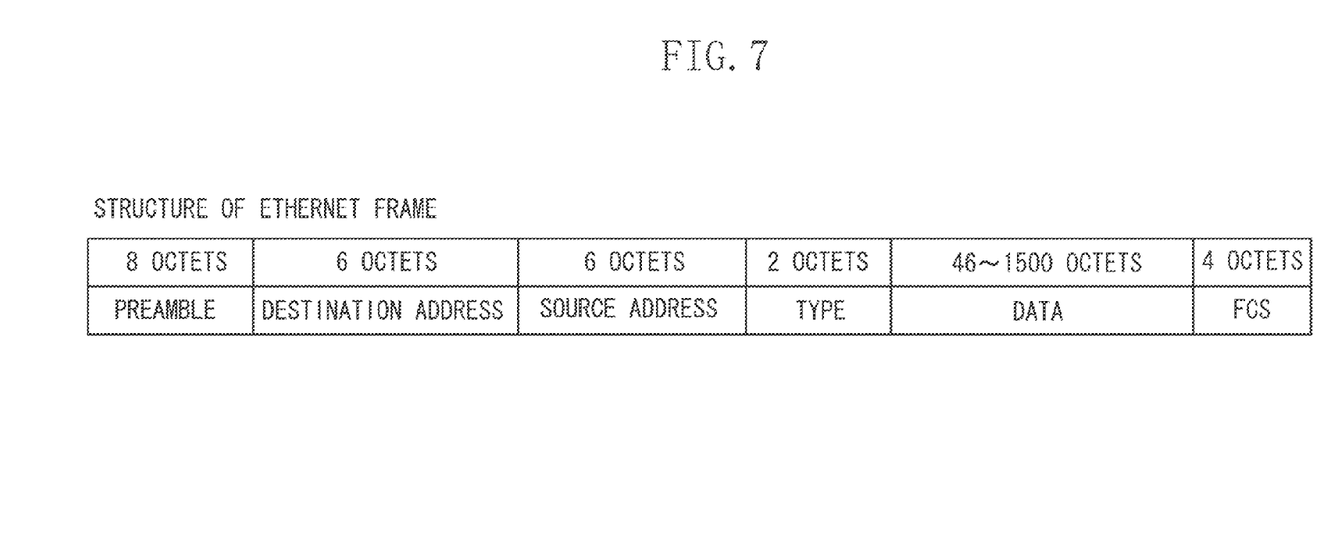
FIG. 7 is a diagram illustrating a structure of an Ethernet frame.

FIG. 7 is a diagram illustrating a structure of the Ethernet frame. From the head of data, the structure of the Ethernet frame is divided into regions of 8 octets, 6 octets, 6 octets, 2 octets, 46 octets to 1500 octets, and 4 octets. From the head of the data, each of the regions respectively serves as a destination address, a source address, a type, data, and a frame check sequence (FCS). The MAC address of the network controller is used as the source address.

Japanese Patent Application Laid-Open No. 2000-151670 discloses a configuration in which the first 3 octets of the MAC address whose packet is allowed to be transmitted is registered on a hub in advance. Upon receipt of a packet, the hub checks a MAC address of a source address of the received packet to determine whether the packet is allowed to be transmitted.

Further, it is known that, based on the MAC address of the network controller, the hub also checks whether the network controller is normal hardware. The configuration thereof will be described in detail with reference to FIG. 8A.

Figure 8A:
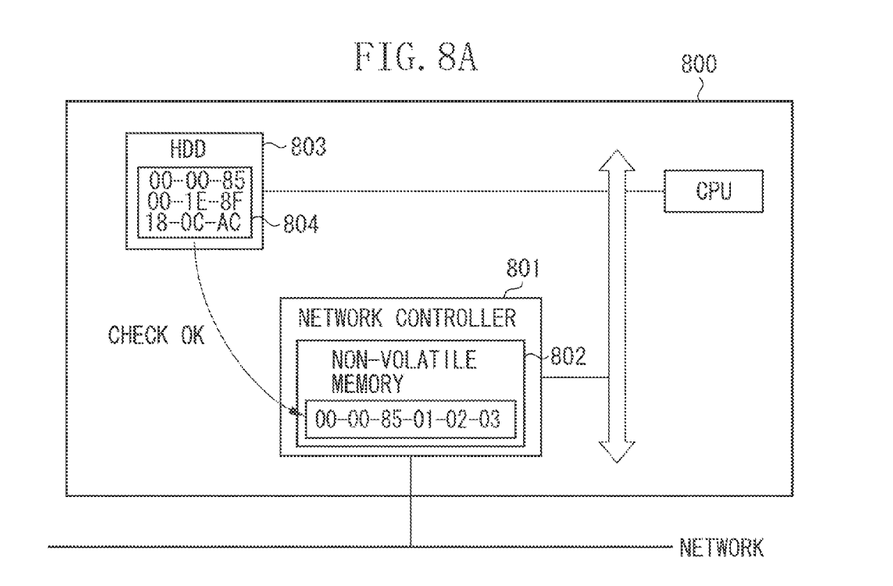
FIGS. 8A and 8B are diagrams illustrating replacement of a network controller.

FIG. 8A is a diagram illustrating an information processing apparatus 800. A network controller 801 includes a non-volatile memory 802, and the MAC address of the network controller 801 is stored in the non-volatile memory 802. Further, a hard disk drive (HDD) 803 stores a vendor ID table 804 that includes vendor IDs issued to a vendor of the information processing apparatus 800.

For example, in a case where the vendor runs out of the MAC address corresponding to the vendor ID issued by the IEEE or at the time of manufacturing a new product, the IEEE issues a new vendor ID to the vendor. In FIG. 8A, three types of vendor IDs are stored in the vendor ID table 804. This indicates that the three types of vendor IDs are issued by the IEEE to the vendor of the information processing apparatus 800.

When the network controller 801 is initialized, the information processing apparatus 800 determines whether the first 3 octets of the MAC address of the network controller 801 matches any one of the vendor IDs stored in the vendor ID table 804. In a case where the first 3 octets of the MAC address of the network controller 801 matches any one of the vendor IDs, the information processing apparatus 800 determines that the network controller 801 is the normal hardware and enables network access. On the other hand, in a case where the first 3 octets of the MAC address of the network controller 801 does not match any one of the vendor IDs, the information processing apparatus 800 determines that the network controller 801 is not the normal hardware and ends processing as an error.

As described above, in a case where the first 3 octets of the MAC address of the network controller 801 does not match any one of the vendor IDs stored in the information processing apparatus 800, the information processing apparatus 800 can determine that the network controller 801 is not the normal hardware. However, if the processing thereof is uniformly ended as the error when the first 3 octets of the MAC address of the network controller 801 does not match the vendor ID stored in the information processing apparatus 800, this may cause a problem described below.

Figure 8B:
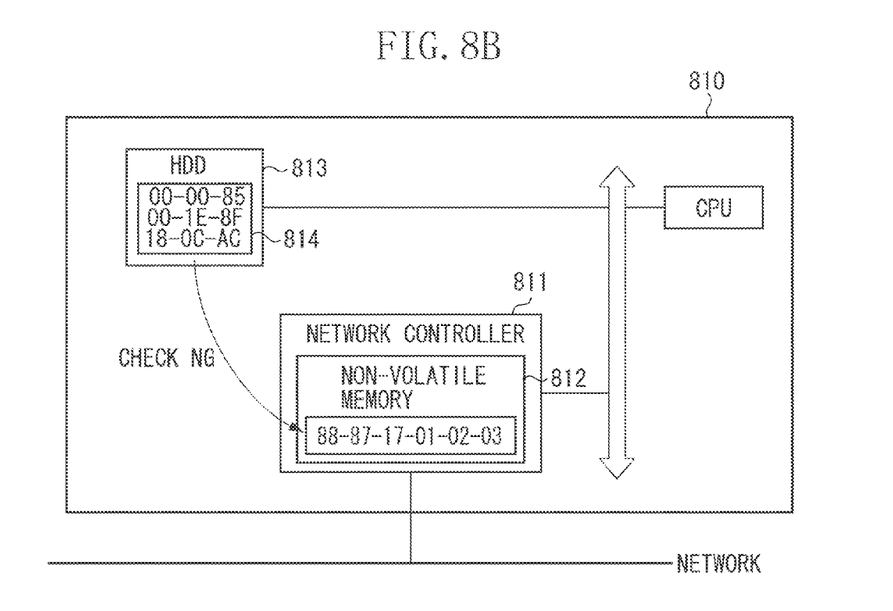

There may be a case where the network controller 801 of the information processing apparatus 800 is replaced with a new network controller. In addition, there may be a case where a new vendor ID is issued by the IEEE. An information processing apparatus 810 in FIG. 8B illustrates a state where the network controller 801 of the information processing apparatus 800 of FIG. 8A has been newly replaced with a network controller 811. A MAC address of the network controller 811 is stored in a non-volatile memory 812 of the network controller 811 that is newly connected to the information processing apparatus 810. The first 3 octets of the MAC address, "88-87-17", is a normal vendor ID that is newly provided by the IEEE, and thus the network controller 811 is originally the normal hardware. However, in the example illustrated in FIG. 8B, because a vendor ID table 814 of a HDD 813 is not updated, the information processing apparatus 810 mistakenly determines that the network controller 811 is not the normal hardware in spite of the fact that the network controller 811 is the normal hardware. To solve the above problem, there is provided a method in which a user updates the vendor ID table 814. However, in a case where the vendor ID table 814 is to be updated by the user, time and effort of the user will be increased if the information processing apparatus as an update target is increased in number.

SUMMARY

The present disclosure is directed to an information processing apparatus capable of reducing time and effort of a user required to update a vendor ID table.

According to an aspect of the present invention, an information processing apparatus including a network controller which controls communication with an apparatus on a network includes a storage unit configured to store reference information to determine whether the network controller is a usable network controller, a determination unit configured to determine whether the network controller is a usable network controller based on the reference information and identification information for identifying the network controller, an acquisition unit configured to acquire update information for updating the reference information from an external apparatus in a case where the determination unit determines that the network controller is not a usable network controller, and an update unit configured to update the reference information stored in the storage unit based on the update information acquired by the acquisition unit.

According to another aspect of the present invention, an information processing apparatus including a network controller which controls communication with an apparatus on a network includes a storage unit configured to store a vendor identification (ID), a determination unit configured to determine whether the vendor ID matches the first 3 octets of a media access control (MAC) address of the network controller, an acquisition unit configured to acquire update information for updating the vendor ID from an external apparatus in a case where the determination unit determines that the vendor ID does not match the first 3 octets of the MAC address, and an update unit configured to update the vendor ID stored in the storage unit based on the update information acquired by the acquisition unit.

Further features of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings.

Hereinafter, a first exemplary embodiment will be described.

Figure 1:
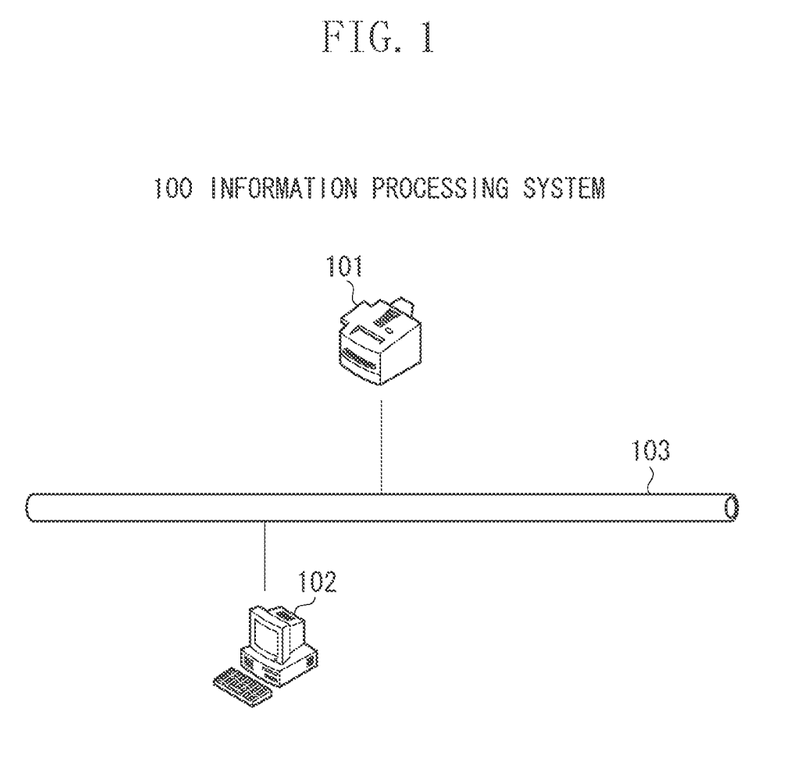
FIG. 1 is a diagram illustrating an information processing system.

A configuration of an information processing system 100 according to the present exemplary embodiment will be described with reference to FIG. 1. The information processing system 100 includes an information processing apparatus 101 and a management server 102. The information processing apparatus 101 and the management server 102 are connected with each other for communication via a network 103.

The management server 102 manages the latest version of a vendor ID list issued by the IEEE to a vendor of the information processing apparatus 101. For example, the management server 102 is provided by the vendor of the information processing apparatus 101. Every time the IEEE issues a new vendor ID to the vendor of the information processing apparatus 101, the vendor of the information processing apparatus 101 updates the vendor ID list managed by the management server 102. The information processing apparatus 101 can acquire the latest version of the vendor ID list by accessing the management server 102.

Figure 2:
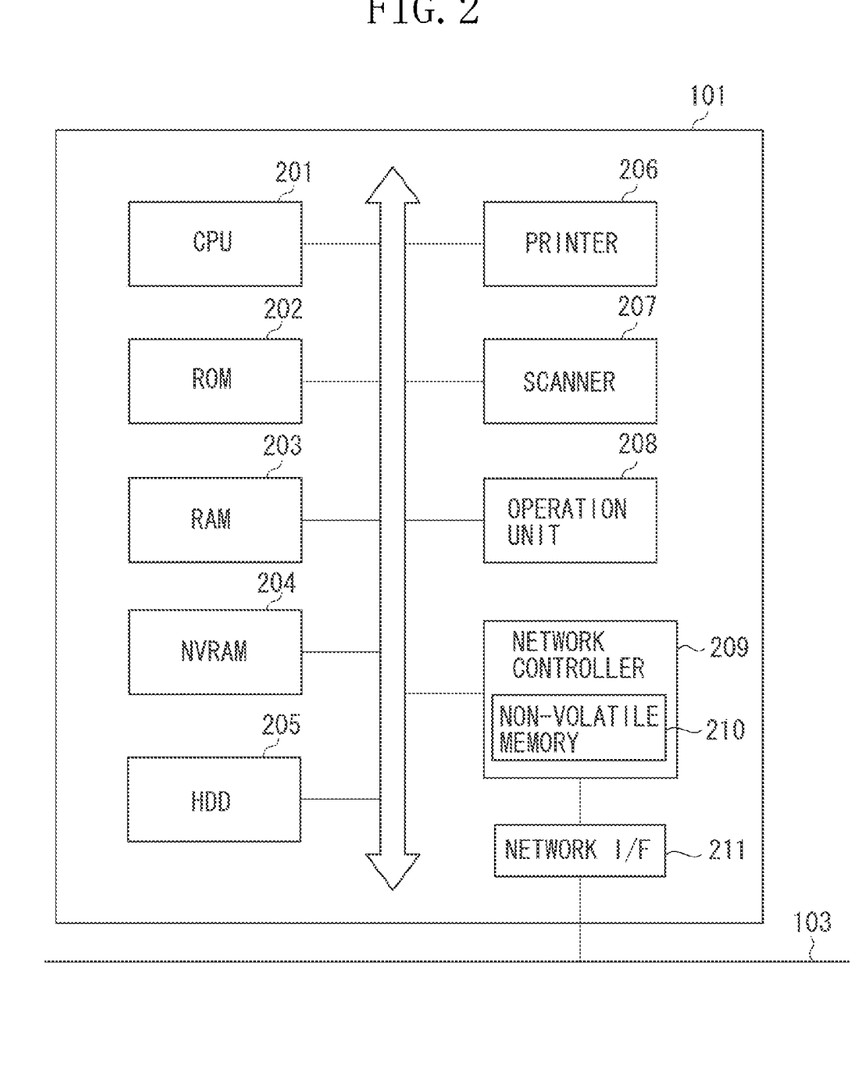
FIG. 2 is a diagram illustrating a configuration of an information processing apparatus.

Next, a hardware configuration of the information processing apparatus 101 will be described with reference to FIG. 2. The information processing apparatus 101 is a multifunction peripheral (i.e., printing apparatus) having a copy function, a print function, a scan function, and a transmission function. In the present exemplary embodiment, description will be given by taking the multifunction peripheral as an example. However, the information processing apparatus 101 is not limited to the multifunction peripheral. The information processing apparatus 101 does not have to include all of the above-described functions, and may include at least any one of the above-described functions or may include other functions in addition to the above-described functions. Further, the information processing apparatus 101 may be a PC.

A central processing unit (CPU) 201 reads a control program stored in a read-only memory (ROM) 202 to control the overall operation of the information processing apparatus 101. A random access memory (RAM) 203 is used as a temporary storage region such as a main memory and a work area of the CPU 201. A non-volatile RAM (NVRAM) 204 is for storing various types of information. A hard disk drive (HDD) 205 is used as a storage region for storing font data, an emulation program, form data, and a vendor ID table that will be described below.

In the information processing apparatus 101, the configuration is such that the CPU 201 independently executes each step of processing illustrated in a flowchart described below using a single memory (either the RAM 203 or the HDD 205). However, a configuration other than the above configuration may be employed as well. For example, the configuration may be such that a plurality of CPUs cooperatively executes each step of the processing illustrated in the flowchart described below using a plurality of RAMs or HDDs.

A printer 206 executes printing processing based on a print job or image data generated by a scanner 207. The scanner 207 generates image data by reading a document. An operation unit 208 is provided with a liquid crystal display unit having a touch-panel function, and a keyboard. A user can input an instruction to the information processing apparatus 101 via the operation unit 208.

A network controller 209 communicates with an external apparatus, such as the management server 102, on the network 103 via a network interface (I/F) 211. The network controller 209 is provided with a non-volatile memory 210. The non-volatile memory 210 stores a MAC address that serves as identification information for identifying the network controller 209. In the present exemplary embodiment, the network controller 209 and the network I/F 211 are described as individual pieces of hardware. However, the configuration of the network controller 209 and the network I/F 211 is not limited thereto. The network controller 209 and the network I/F 211 may be integrally configured as the hardware.

There may be a case where the network controller 209 is replaced with a new network controller. As with the case of the network controller 209, the new network controller also includes a non-volatile memory that stores a MAC address.

Figure 3A:
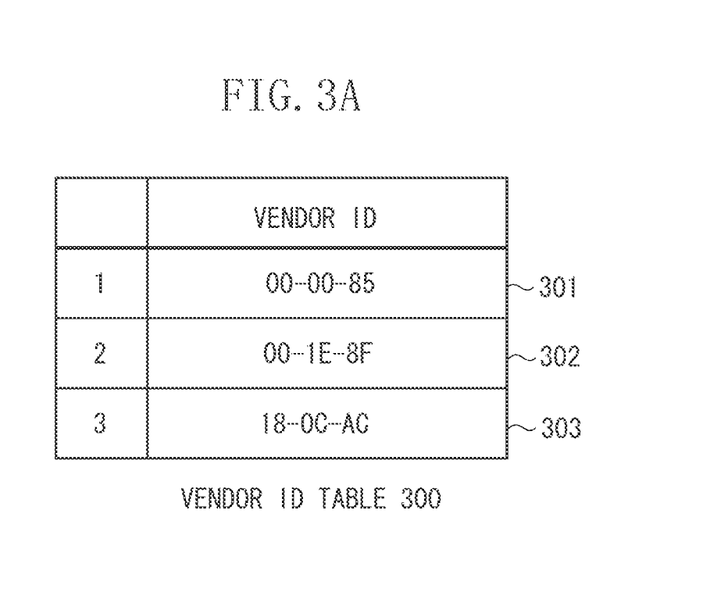
FIGS. 3A and 3B are vendor ID tables.

Next, a vendor ID table stored in the HDD 205 of the information processing apparatus 101 will be described. FIG. 3A is a vendor ID table 300 stored in the HDD 205. Three types of vendor IDs 301, 302, and 303 are stored in the vendor ID table 300 as the vendor IDs issued by the IEEE to the vendor that manufactures the information processing apparatus 101. The vendor IDs stored in the vendor ID table 300 are referred to as reference information used to determine whether the network controller 209 is the normal hardware.

Next, processing for determining whether the network controller 209 is the normal hardware will be described with reference to a flowchart in FIG. 4. The CPU 201 executes the program stored in the memory such as the ROM 202 by loading the program into the RAM 203 to process each step illustrated in the flowchart in FIG. 4.

Figure 4:
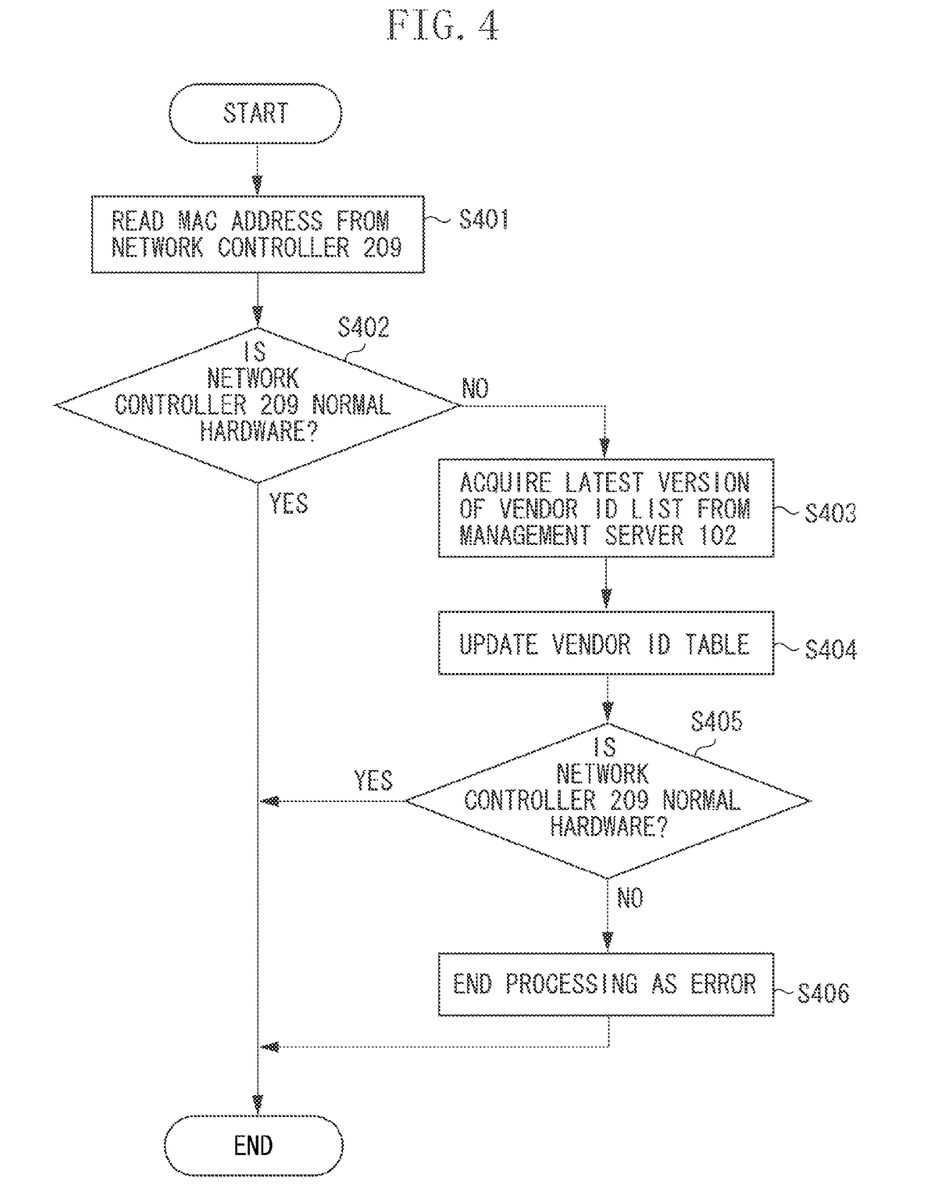
FIG. 4 is a flowchart illustrating processing executed in a first exemplary embodiment.

The processing for determining whether the network controller 209 is the normal hardware, illustrated in FIG. 4, will be executed when the network controller 209 is initialized or a packet is transmitted to the external apparatus via the network controller 209. First, in step S401, the CPU 201 reads the MAC address of the network controller 209 from the non-volatile memory 210 of the network controller 209. The MAC address of the network controller 209 is used as the identification information for identifying the network controller 209.

Next, in step S402, the CPU 201 determines whether the network controller 209 is the normal hardware. Specifically, the CPU 201 determines whether the first 3 octets of the MAC address acquired in step S401 matches the vendor ID stored in the vendor ID table 300. If the first 3 octets of the MAC address matches the vendor ID (YES in step S402), the CPU 201 determines that the network controller 209 is the normal hardware and ends the processing illustrated in FIG. 4. For example, in a case where the MAC address read in step S401 is "00-00-85-01-02-03", the first 3 octets of this MAC address is "00-00-85". This matches the vendor ID 301 of the vendor ID table 300. Therefore, in step S402, the network controller 209 is determined to be the normal hardware.

On the other hand, in step S402, if the first 3 octets of the MAC address does not match the vendor ID (NO in step S402), the CPU 201 determines that the network controller 209 is not the normal hardware. Then, the processing proceeds to step S403. For example, in a case where the MAC address read in step S401 is "88-87-17-01-02-03", the first 3 octets of the MAC address is "88-87-17". This does not match any of the vendor IDs stored in the vendor ID table 300. Therefore, in step S402, the CPU 201 determines that the network controller 209 is not the normal hardware.

Next, in step S403, the CPU 201 acquires the latest version of the vendor ID list from the management server 102 via the network controller 209. This is the processing for coping with the case where the CPU 201 makes an incorrect determination in step S402 in spite of the fact that the network controller 209 is actually the normal hardware due to the vendor ID table 300 that has not been updated. The latest version of the vendor ID list is stored in the management server 102, and this vendor ID list is used as update information for updating the vendor ID table 300.

In step S403, the CPU 201 transmits a request packet for requesting the latest version of the vendor ID list to the management server 102. The MAC address read in step S401 is used for the source address of the request packet. However, the MAC address used for the source address is not limited to the MAC address read in step S401, and another MAC address may be used therefor. For example, a MAC address for temporary use, which is stored in the HDD 205 in advance, may be used. In addition, the MAC address for temporary use may be created by combining any one of the vendor IDs stored in the vendor ID table 300 and the last 3 octets of the MAC address read in step S401.

Figure 3B:
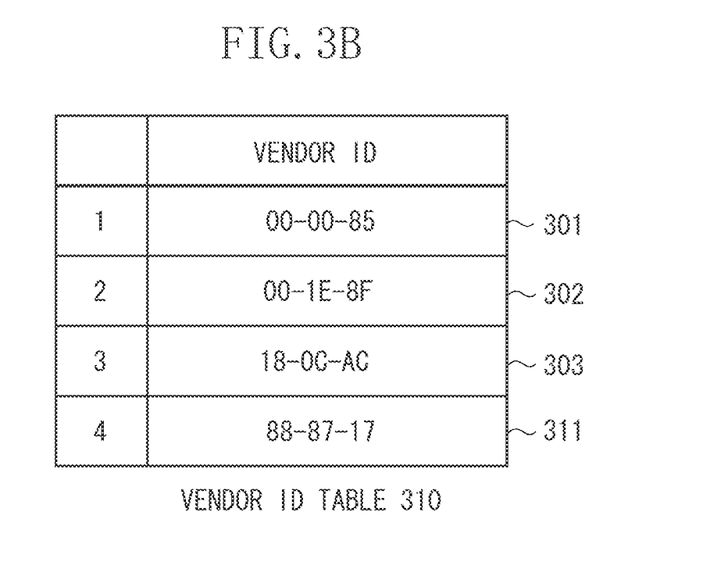

Next, in step S404, the CPU 201 updates the vendor ID table 300 based on the latest version of the vendor ID list acquired in step S403. A vendor ID table 310 in FIG. 3B is the updated vendor ID table. A vendor ID 311 of the vendor ID table 310 has been newly added thereto by the update processing executed in step S404. With the processing in steps S403 and S404, the information processing apparatus 101 automatically updates the vendor ID table 300 without asking for an instruction from the user. Therefore, time and effort of the user for updating the vendor ID table 300 can be reduced.

Next, in step S405, based on the updated vendor ID table 310 updated in step S404, the CPU 201 determines whether the network controller 209 is the normal hardware again. In step S405, in a same manner as step S402, the CPU 201 determines whether the first 3 octets of the MAC address acquired in step S401 matches the vendor ID stored in the updated vendor ID table 310.

In step S405, if the CPU 201 determines that the network controller 209 is the normal hardware (YES in step S405), the CPU 201 ends the processing illustrated in FIG. 4. On the other hand, in step S405, if the CPU 201 determines that the network controller 209 is not the normal hardware (NO in step S405), the processing proceeds to step S406 to end as an error. Specifically, the CPU 201 does not execute communication via the network controller 209 (i.e., disables the communication), and causes the operation unit 208 to display a message prompting the user to replace the network controller 209 with the normal network controller.

As described above, according to the present exemplary embodiment, because the information processing apparatus 101 automatically updates the vendor ID table 300 (in steps S403 and S404) without asking for an instruction from the user, time and effort of the user for updating the vendor ID table 300 can be reduced.

In addition, in step S405, because the information processing apparatus 101 automatically re-executes the processing for determining whether the network controller 209 is the normal hardware based on the updated vendor ID table 310, convenience of the user can be improved.

In the present exemplary embodiment, the configuration has been described in which the latest version of the vendor ID list is acquired from the management server 102 when the CPU 201 determines that the network controller 209 is not the normal hardware (in other words, when "NO" in step S402). However, the latest version of the vendor ID list may be acquired from the management server 102 at another timing. For example, the latest version of the vendor ID list may be acquired from the management server 102 at the timing between step S401 and step S402.

A second exemplary embodiment will be described below.

In the first exemplary embodiment, in a case where the network controller 209 is not the normal hardware, because the CPU 201 repeatedly acquires the latest version of the vendor ID list from the management server 102 every time the flowchart in FIG. 4 is executed, this may cause the CPU 201 to perform useless communication. Therefore, a purpose of the present exemplary embodiment is to prevent the useless communication from being executed by setting the frequency of acquisition of the latest version of the vendor ID list from the management server 102 to be only once.

Figure 5:
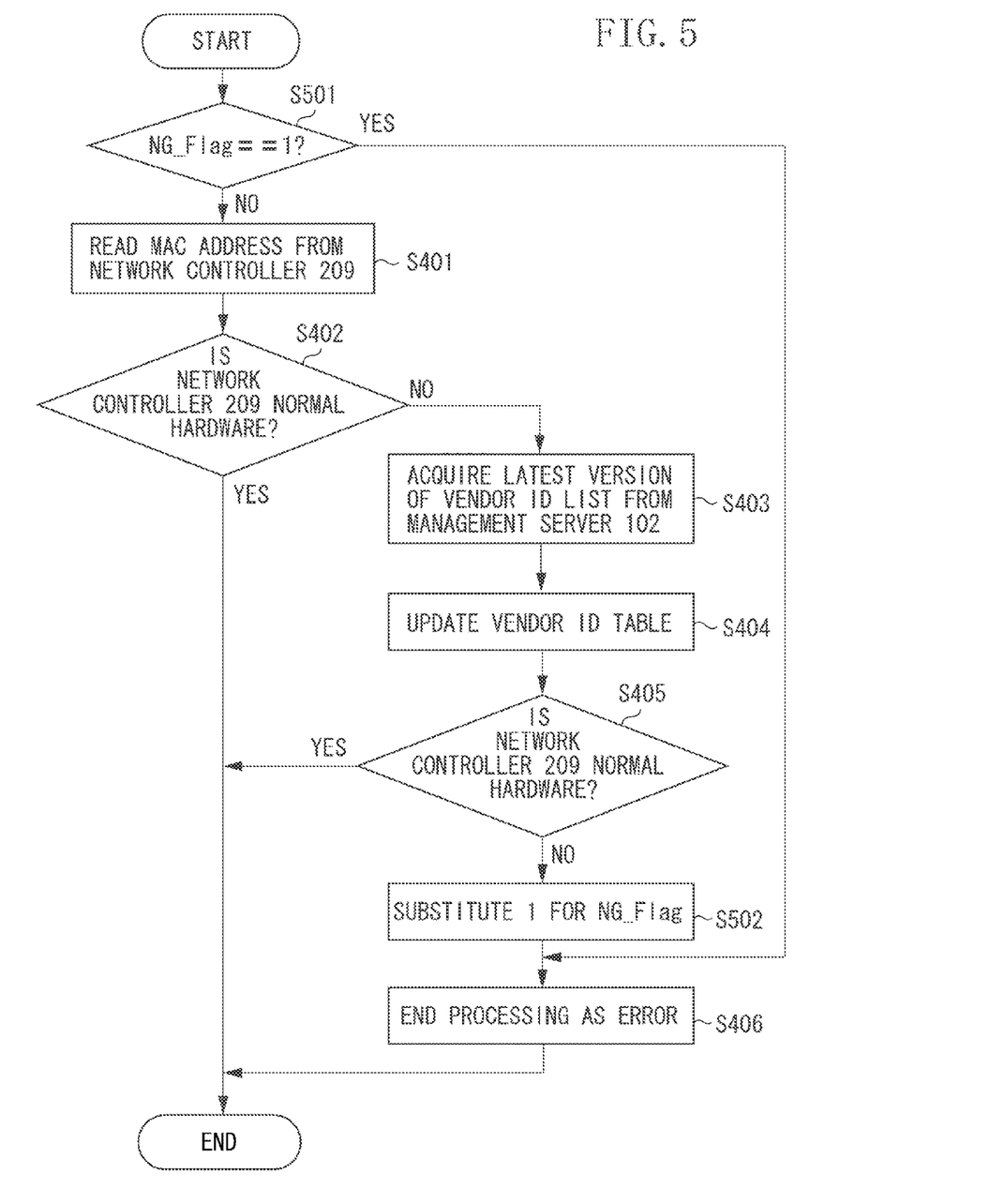
FIG. 5 is a flowchart illustrating processing executed in a second exemplary embodiment.

The flowchart in FIG. 5 illustrates processing for determining whether the network controller 209 is the normal hardware. The configuration of the information processing apparatus 101 is the same as that in FIG. 2, and thus the description thereof will not be repeated. Further, of the steps illustrated in FIG. 5, the steps with the same reference numerals as those in FIG. 4 execute the same processing as that in FIG. 4, and thus the description thereof will not be repeated. The CPU 201 executes the program stored in the memory such as the ROM 202 by loading the program into the RAM 203 to process each step illustrated in the flowchart in FIG. 5.

The processing for determining whether the network controller 209 is the normal hardware, illustrated in FIG. 5, will be executed when the network controller 209 is initialized or a packet is transmitted to the external apparatus via the network controller 209.

First, in step S501, the CPU 201 determines whether a variable NG_Flag is 1. The variable NG_Flag is unique to the present exemplary embodiment, and is stored in the NVRAM 204. The initial value of the variable NG_Flag is 0. In step S501, if the CPU 201 determines that the variable NG_Flag is 1 (YES in step S501), the processing proceeds to step S406 to end as an error without the CPU 201 acquiring the latest version of the vendor ID list from the management server 102. Although the processing thereof will be further described below in step S502, in a case where the variable NG_Flag is 1, this indicates that the CPU 201 has determined that the network controller 209 is not the normal hardware after updating the vendor ID table in step S404. In step S501, if the CPU 201 determines that the variable NG_Flag is not 1 (NO in step S501), the processing proceeds to step S401.

In step S405, if the CPU 201 determines that the network controller 209 is not the normal hardware (NO in step S405), the processing proceeds to step S502. In step S502, the CPU 201 substitutes 1 for the variable NG_Flag. At this time, the CPU 201 determines that the network controller 209 is not the normal hardware, after updating the vendor ID table in step S404. Accordingly, in the present exemplary embodiment, before the network controller 209 is replaced with a new network controller, the latest version of the vendor ID list will not be acquired from the management server 102.

By substituting 1 for the variable NG_Flag in step S502, when the flowchart in FIG. 5 is executed next time, the CPU 201 determines in step S501 that the variable NG_Flag is 1. With the above-described processing, useless communication can be prevented from being executed that the latest version of the vendor ID list is acquired from the management server 102 repeatedly in spite of the fact that the network controller 209 is not the normal hardware.

Further, in the present exemplary embodiment, to replace the network controller 209 with the new network controller, the power of the information processing apparatus 101 has to be turned OFF once. Then, when the power of the information processing apparatus 101 is turned OFF, the variable NG_Flag is reset to 0. In other words, if the network controller 209 is replaced with the new network controller while the variable NG_Flag is 1, the variable NG_Flag is reset to 0. After the CPU 201 determines in step S501 that the variable NG_Flag is not 1, the processing in step S401 and subsequent steps will be executed.

As described above, according to the present exemplary embodiment, in a case where the CPU 201 determines that the network controller 209 is not the normal hardware, useless communication can be prevented from being executed by setting the frequency of acquisition of the latest version of the vendor ID list from the management server 102 to be only once. However, the frequency of acquisition of the latest version of the vendor ID list from the management server 102 is not limited to only once, but may be set to be a predetermined frequency such as twice or more.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-257558 filed Nov. 26, 2012, which is hereby incorporated by reference herein in its entirety.

What is claimed is:

1. An information processing apparatus including a network controller which controls communication with an apparatus on a network, the information processing apparatus comprising:
  a processor;
  a memory device configured to store a vendor identification (ID) list;
  a determination unit configured to determine, based on the vendor ID list and a MAC address of the network controller, whether the network controller is a normal network controller;
  an acquisition unit configured to acquire a latest vendor ID from an external apparatus on the network in a case where the determination unit determines that the network controller is not a normal network controller; and
  an update unit configured to update the vendor ID list stored in the memory device to the latest vendor ID acquired by the acquisition unit,
  wherein, in a case where the acquisition unit has acquired the vendor identification (ID) list, the determination unit re-determines, based on matching results of the latest vendor ID list and the MAC address, whether the network controller is the normal network controller,
  wherein in a case where the determination unit determines that the network controller is not a normal network controller based on matching results of the latest vendor ID list and the MAC address, the network controller is prohibited from executing communication and the information processing apparatus displays an error message,
  wherein the vendor ID indicates first 3 octets of a MAC address, and
  wherein the determination unit, the acquisition unit and the update unit are implemented at least in part by the processor executing at least one program.

2. The information processing apparatus according to claim 1, wherein, in a case where the acquisition unit has acquired the vendor identification (ID) list, the determination unit re-determines, based on the latest vendor ID list and the media access control (MAC) address, whether the network controller is the normal network controller.

3. The information processing apparatus according to claim 2, wherein in a case where the determination unit determines, based on the latest vendor ID list and the MAC address of the network controller, that the network controller is prohibited from executing communication.

4. The information processing apparatus according to claim 2, wherein in a case where the determination unit determines, based on the latest vendor ID list and the MAC address, the information processing apparatus displays a message prompting a user to change the network controller.

5. The information processing apparatus according to claim 1, wherein
the vendor ID list indicates a plurality of vendor IDs;
the determination unit determines that the network controller is a normal network controller in a case where first 3 octets of the MAC address matches any of the plurality of vendor IDs; and
the determination unit determines that the network controller is not a normal network controller in a case where the first 3 octets of the MAC address matches none of the plurality of vendor IDs.

6. The information processing apparatus according to claim 1, wherein the information processing apparatus is a printing apparatus.

7. A control method for an information processing apparatus including a network controller which controls communication with an apparatus on a network, and memory device which stores a vendor identification (ID) list, the control method comprising:
determining, based on the vendor ID list stored in the memory device, whether the network controller is a normal network controller;
acquiring a latest vendor ID list from an external apparatus in a case where the determination unit has determined that the network controller is not a normal network controller;
updating the vendor ID list stored in the memory device to the acquired latest vendor ID list;
re-determining, based on matching results of the latest vendor ID list and the MAC address, whether the network controller is the normal network controller in a case where the vendor ID list has been acquired; and
prohibiting from executing communication and displaying an error message in a case where it is determined that the network controller is not the normal network controller based on matching results of the latest vendor ID list and the MAC address;
wherein the vendor ID indicates first 3 octets of a MAC address.

8. A non-transitory computer-readable storage medium storing a program that causes a computer to execute a control method comprising:
determining, based on the vendor ID list stored in a memory device, whether a network controller is a normal network controller;
acquiring a latest vendor ID list from an external apparatus in a case where the determination unit has determined that the network controller is not a normal network controller;
updating the vendor ID list stored in the memory device to the acquired latest vendor ID list;
re-determining, based on matching results of the latest vendor ID list and the MAC address, whether the network controller is the normal network controller in a case where the vendor ID list has been acquired; and
prohibiting from executing communication and displaying an error message in a case where it is determined that the network controller is not the normal network controller based on matching results of the latest vendor ID list and the MAC address;
wherein the vendor ID indicates first 3 octets of a MAC address.

* * * * *